(12) United States Patent
Tanaka et al.

(10) Patent No.: US 6,896,288 B2
(45) Date of Patent: May 24, 2005

(54) GUIDE MEMBER FOR CURTAIN AIRBAG

(75) Inventors: Tadashi Tanaka, Asaka (JP); Masayoshi Kumagai, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/620,450

(22) Filed: Jul. 17, 2003

(65) Prior Publication Data

US 2004/0012174 A1 Jan. 22, 2004

(30) Foreign Application Priority Data

Jul. 22, 2002 (JP) ........................................ 2002-212693

(51) Int. Cl.⁷ .......................... B60R 21/16; B60R 21/20
(52) U.S. Cl. .................................. 280/743.2; 280/730.2
(58) Field of Search ........................... 280/743.2, 730.2, 280/749, 801.2

(56) References Cited

U.S. PATENT DOCUMENTS

| | | | | |
|---|---|---|---|---|
| 4,909,541 A | * | 3/1990 | Tokugawa | ............... 280/801.2 |
| 5,547,222 A | * | 8/1996 | Schmidt | .................. 280/801.2 |
| 5,951,046 A | | 9/1999 | Hosoda et al. | |
| 6,237,938 B1 | | 5/2001 | Boxey | |
| 6,412,810 B1 | | 7/2002 | Wipasuramonton et al. | |
| 6,454,296 B1 | | 9/2002 | Tesch et al. | |
| 6,733,035 B2 | | 5/2004 | Thomas et al. | |
| 2003/0080541 A1 | * | 5/2003 | Kalandek et al. | ........ 280/730.2 |

FOREIGN PATENT DOCUMENTS

| | | |
|---|---|---|
| EP | 0 642 957 A2 | 3/1995 |
| EP | 0 955 213 A1 | 11/1999 |
| WO | WO 01/32474 A2 | 5/2001 |

* cited by examiner

*Primary Examiner*—Ruth Ilan
(74) *Attorney, Agent, or Firm*—Foley & Lardner LLP

(57) ABSTRACT

A guide member for a curtain airbag that a pipe or rod shaped guide extending vertically relative to the vehicle body along a C pillar. The guide member includes, upper and lower fixing sections for fixing the upper and lower ends of the guide to the C pillar. The guide member also includes temporarily tacking sections for tacking the upper and lower fixing sections to the C pillar, when the guide member is mounted to the C pillar. The C pillar has temporarily-tacking-section insertion openings corresponding to the temporarily tacking sections. When the guide member is mounted to the C pillar, the temporarily tacking sections are inserted into the corresponding temporarily-tacking-section insertion openings for engagement, so that the guide member can be temporarily tacked to the C pillar.

14 Claims, 7 Drawing Sheets

GUIDE MEMBER FOR CURTAIN AIRBAG

BACKGROUND

The present invention relates to a guide member for guiding a curtain-like airbag which is deployed along the side structure of the compartment of a vehicle.

In automobiles equipped with curtain airbag systems, the curtain airbag is inflated downward relative to a vehicle body along the side structure (such as a door and/or a pillar) of the compartment in the event of a side impact or rollover to protect the head of an occupant and to prevent the occupant from being thrown out of the vehicle when a window opens.

U.S. Pat. No. 6,237,938 (incorporated by reference herein) discloses an arrangement that includes a C pillar with a guide member for guiding the rear end of a curtain airbag, which is inflated along the side structure of the compartment, downward relative to the vehicle body and along the pillar.

The guide member disclosed in the above-mentioned patent includes a box section member called a track and a slider member arranged in the track and movable along the length of the track, the rear end of the curtain airbag being connected to the slider member. Also, latches are arranged at equal intervals substantially over the whole length of the track to prevent the rear end of the curtain airbag, which has moved downward, from returning upward.

The track has mounting flanges at the upper and lower ends, each flange being mounted to the C pillar with a bolt or a screw.

When mounting the guide member to the pillar with bolts or screws, as described above, a worker must hold the guide member by one hand and handle a tool by the other hand to rotate the bolts or screws, thus having low working efficiency. When the worker moves the one hand off the guide member during the bolting or screwing operation, the guide member may be rotated together with the bolts or screws.

SUMMARY OF THE INVENTION

One exemplary object of the present invention is to provide a guide member for a curtain airbag having remarkably high vehicle-installation efficiency. Another exemplary object of the invention is to provide a guide member capable of mooring the end of a curtain airbag that has move downward along the guide member. These two objects are only examples of the objectives accomplished by certain embodiments of the present invention and are not limiting to the scope of the present invention which is defined by the claims set forth below.

A guide member for a curtain airbag according to the present invention is a guide member for guiding the longitudinal ends of the curtain airbag that is deployed downward along the side structure of the compartment of a vehicle, wherein in the guide member for the curtain airbag extending vertically and mounted to a pillar of the vehicle, each of the upper part and the lower part of the guide member includes a section for temporarily tacking or connecting the guide member to the pillar.

The guide member can bring the temporarily tacking section into engagement with the vehicle body for temporal tacking or connection. As a result, a vehicle installation work is simplified. The temporarily tacking section is provided to each of the upper part and the lower part of the guide member, when the guide member is fixed to the body with bolts or screws, the guide member is not rotated together with the bolts or screws.

Preferably, each of the temporarily tacking sections extends outward in a direction intersecting the longitudinal direction of the guide member. In such a case, providing the vehicle body with openings that correspond to the temporarily tacking sections allows the guide member to be temporarily tacked only by inserting the temporarily tacking sections into the openings.

The invention may have a mooring section at the end of the curtain airbag, which may be formed such that the lower part of the guide member is bent or curved, so as to prevent the ends of the curtain airbag which has moved downward along the guide member from returning upward. Providing the guide member with the mooring section formed of a bent or curved portion is remarkably simple as compared with forming a latch as in U.S. Pat. No. 6,237,938, thus reducing the cost of manufacturing the guide member.

A guide member for a curtain airbag according to the invention may include a guide member for guiding the longitudinal ends of the curtain airbag which is deployed downward along the side structure of the compartment of a vehicle, wherein in the guide member for the curtain airbag extends vertically and is mounted to a pillar of the vehicle, a mooring section at the end of the curtain airbag is formed such that the lower part of the guide member is bent or curved so as to prevent the ends of the curtain airbag which has moved downward along the guide member from returning upward.

The guide member for the curtain airbag prevents the ends of the curtain airbag from returning upward, as described above. The guide member has a simple structure and can be manufactured at low cost.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
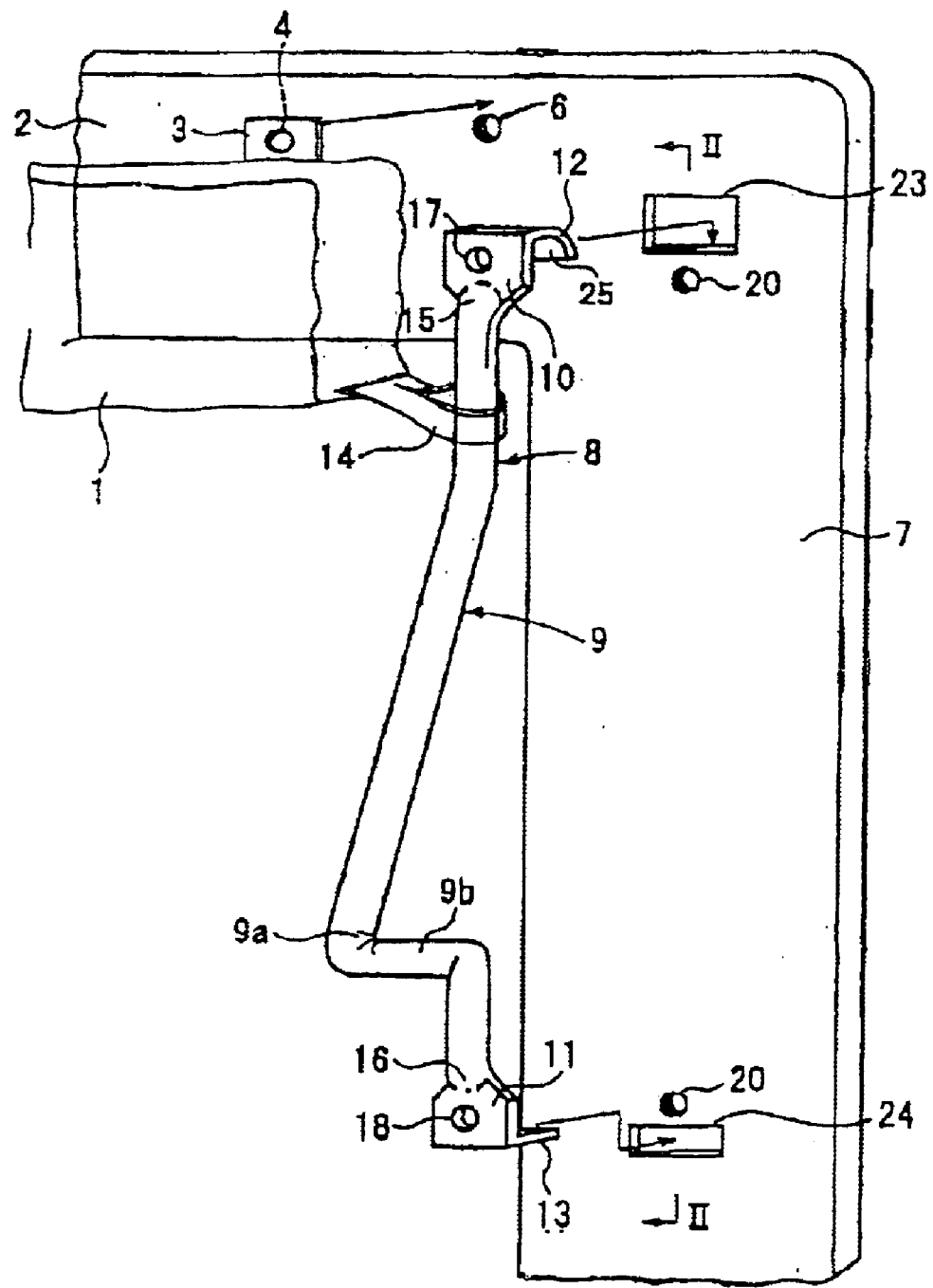
FIG. 1 is an exploded perspective view of a guide member for a curtain airbag according to an embodiment of the present invention.

As shown in FIG. 1, a curtain airbag 1 is arranged along a roof side (a boundary between the ceiling and the side of the compartment) 2 of a vehicle in a longitudinally-folded long thin state. The curtain airbag 1 is inflated by a gas from an inflator (not shown) in the event of a side impact or rollover of the vehicle, and is deployed downward relative to the vehicle along the side structure of the compartment such as a door and a pillar. The curtain airbag 1 has a tab 3 at the upper edge, wherein a bolt 5 (see FIG. 3) is inserted into a bolt insertion hole 4 of the tab 3, and is in turn screwed into a female screw hole 6 of the roof side 2, thereby fixing the curtain airbag 1 to the roof side 2.

The C pillar 7 of the vehicle has a guide member 8 for guiding the rear end of the curtain airbag 1 along the C pillar 7 when the curtain airbag 1 is inflated downward relative to the vehicle body and along the C pillar 7. The guide member 8 includes a rod-shaped guide 9 extending vertically relative to the vehicle body and along the C pillar 7, an upper fixing section 10 and a lower fixing section 11 for fixing the upper and lower ends of the guide 9 to the C pillar 7, respectively, and temporarily tacking sections 12 and 13 for temporarily tacking or connecting the upper and lower fixing sections 10 and 11 to the C pillar 7, respectively, when mounting the guide member 8 to the C pillar 7.

The curtain airbag 1 has a loop-like connecting band 14 in the vicinity of the lower corner at the rear end thereof. The connecting band 14 is hooked around the guide 9, so that the rear end of the curtain airbag 1 is connected to the guide member 8.

The guide 9 may be formed of a pipe member. The lower part of the guide 9 is bent in substantially a crank shape, thus forming a mooring section 9a for the connecting band 14 at a generally L-shaped corner formed by an upper section 9c and a substantially horizontal section 9b of the guide. The horizontal section 9b that connects with the mooring section 9a works as a stopper for preventing the movement of the connecting band 14 downwardly from the mooring section 9a.

The guide 9 has, at the upper and lower ends, leg-shaped sections 15 and 16 for separating the entire guide 9 from the outer surface of the C pillar 7. The leg-shaped sections 15 and 16 are formed such that the upper and lower ends of the guide 9 are bent in substantially a crank shape toward the C pillar 7. The upper and lower fixing section 10 and 11 connect with the ends of the leg-shaped sections 15 and 16, respectively.

The guide member 8 is fixed to the C pillar 7 such that bolts 19 are inserted into bolt insertion holes 17 and 18 (see FIG. 1) formed in the fixing sections 10 and 11, and are then screwed into female screw holes 20 of the C pillar 7, respectively.

Figure 2:
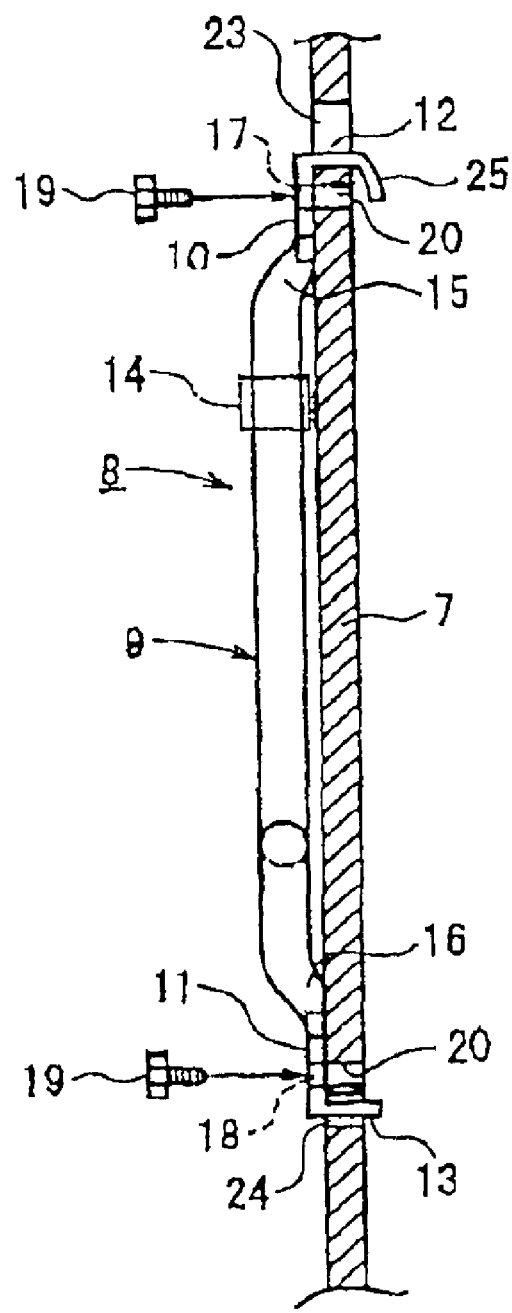
FIG. 2 is a sectional view taken along line II—II of FIG. 1.

The temporarily tacking sections 12 and 13 extend in the extending direction and the intersecting direction of the guide 9 so as to be inserted into the C pillar 7 through the surface at which the upper and lower fixing sections 10 and 11 overlap the C pillar 7, as shown in FIG. 2. The C pillar 7 has temporarily-tacking-section insertion openings 23 and 24 that correspond to the temporarily tacking sections 12 and 13. The upper temporarily tacking section 12 has a hook-shaped section 25 at the end, which is hooked to the lower edge of the opening 23.

In the embodiment, the hook-shaped section 25 is shaped such that the end of the upper temporarily tacking section 12 is bent downward.

The guide member 8 with such a structure can be temporarily tacked to the C pillar 7 such that the upper and lower temporarily tacking sections 12 and 13 are inserted into the corresponding temporarily-tacking-section insertion openings 23 and 24 for engagement. Therefore, there is no need to hold the guide member 8 by hand during the work such as bolting, thus remarkably simplifying installation work.

The hook-shaped section 25 provided at the end of the upper temporarily tacking section 12 is hooked to the lower edge of the opening 23. Therefore, even if a tool comes into contact with the guide member 8 during the work, the guide member 8 does not drop off the C pillar 7.

Since the temporarily tacking sections 12 and 13 are provided at the upper end and the lower end of the guide member 8, respectively, the guide member 8 is not rotated together with the bolts 19 even if the guide member 8 is not held by hand when the bolts 19 are inserted into the respective bolt insertion holes 17 and 18 of the upper and lower fixing sections 10 and 11 and are then screwed into the female screw holes 20 of the C pillar 7.

The guide member 8 mounted to the C pillar 7 guides the connecting band 14 downward when the curtain airbag 1 is inflated. The guide member 8 is arranged such that an upper section 9c above the mooring section 9a angles toward the rear of the vehicle as the upper section increases in height. Accordingly, the connecting band 14 that is the rear end of the curtain airbag 1 is prevented from returning upward when the curtain airbag 1 is guided by the guide member 8 to inflate downward relative to the vehicle body.

When inflated, the curtain airbag 1 decreases in longitudinal length by tension applied to the outer surface and the rear end is pulled forward. As shown in FIG. 3(b), when inflation has been completed, the connecting band 14 cannot move upward and backward along the guide 9, being held at the mooring section 9a.

While in one embodiment of the present invention, the upper or lower part of the fixing sections 10 and 11 are bent toward the C pillar 7 to form the plate-like temporarily tacking sections 12 and 13, respectively, the shape and the forming method of the temporarily tacking sections is not limited to that configuration. For example, the temporarily tacking sections may be formed such that pins or projections are attached to the surfaces of the fixing sections 10 and 11 which overlap with the C pillar 7. These pins or projections may be welded onto the fixing sections. Also, the fixing sections may include an adhesive coating on the surface that contacts the C pillar in order to fix the guide pillar in place during installation.

Figure 4:
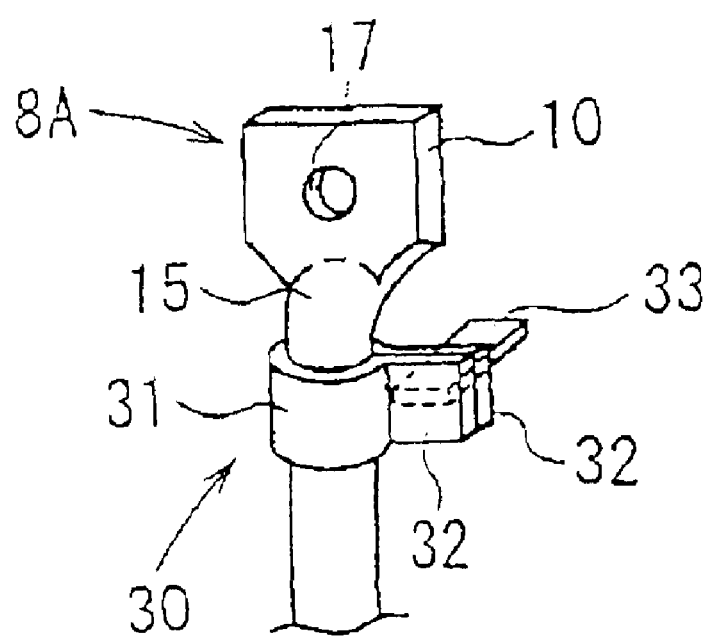
FIG. 4 is a perspective view of the vicinity of the upper part of a guide member for a curtain airbag according to another embodiment of the present invention.

As shown in FIG. 1, the temporarily tacking sections 12 and 13 and the guide member 8 are integrally formed. However, these components may also be formed as separate members. FIG. 4 shows an example in which each temporarily tacking section and the guide member are separately constructed. FIG. 4 is a perspective view of the vicinity of the upper part of a guide member for a curtain airbag according to another embodiment of the present invention.

A guide member 8A of FIG. 4 has a temporarily tacking member 30 at the vicinity of the upper end of the guide 9 (at the vicinity of the boundary with the leg-shaped section 15), which is constructed separately from the guide member 8A. The temporarily tacking member 30 includes a substantially-C-shaped clip 31 which is elastically in contact along the outer periphery of the guide 9 so as to hold the guide 9, a pair of extending pieces 32 and 32 which extends outward from the circumferential opposite ends of the clip 31, and a projecting temporarily tacking section 33 which extends from the side of one extending piece 32 in a direction that intersects the extending direction of the guide 9.

A similar temporarily tacking member 30 may also be attached to the vicinity of the lower end of the guide 9 (at vicinity of the boundary with the leg-shaped section 16), which is not shown. The C pillar has openings in which the temporarily tacking sections 33 of the temporarily tacking member 30 can be fitted.

Figure 3A:
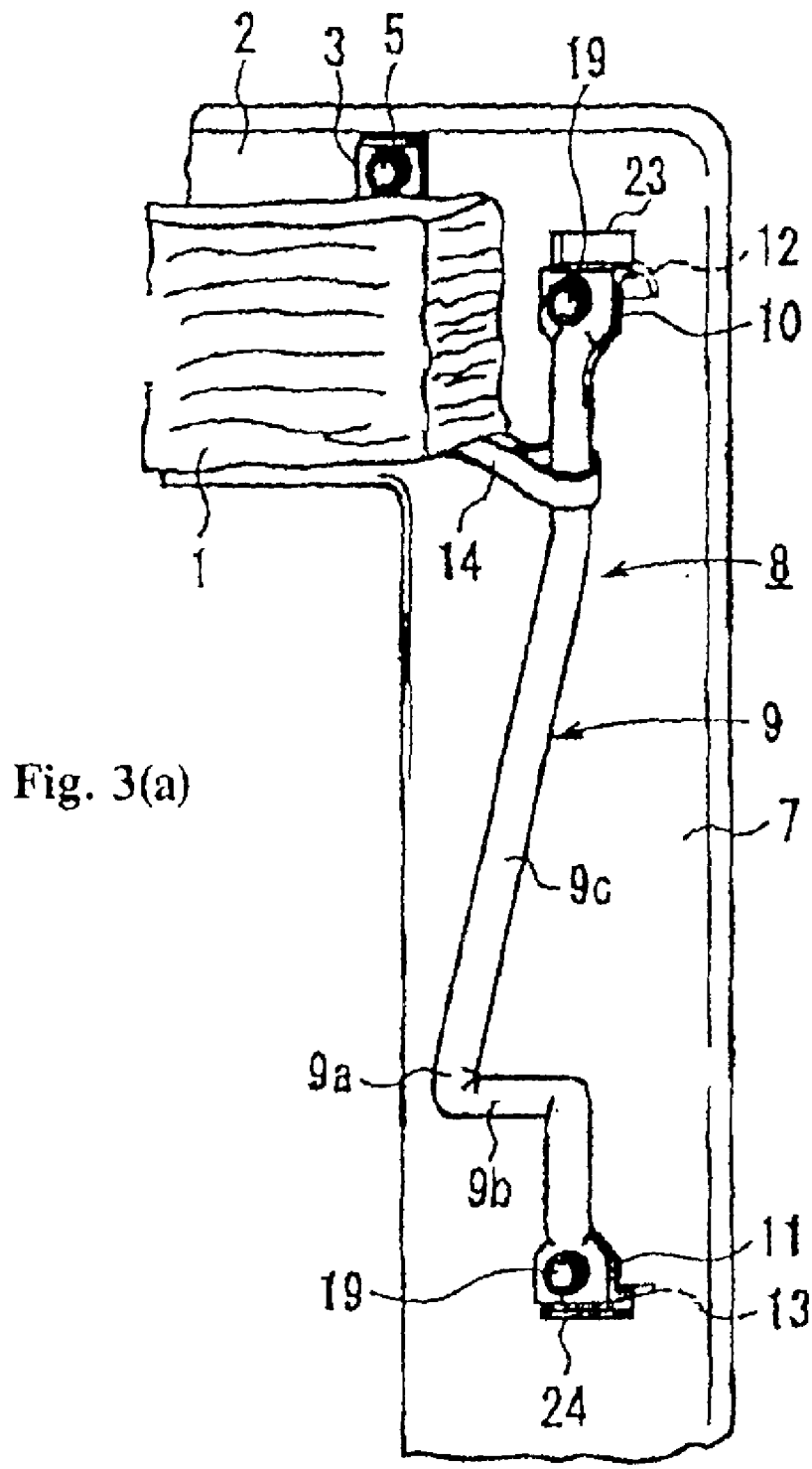
FIG. 3 is a perspective view showing a deployment behavior of the curtain airbag.
Figure 3B:
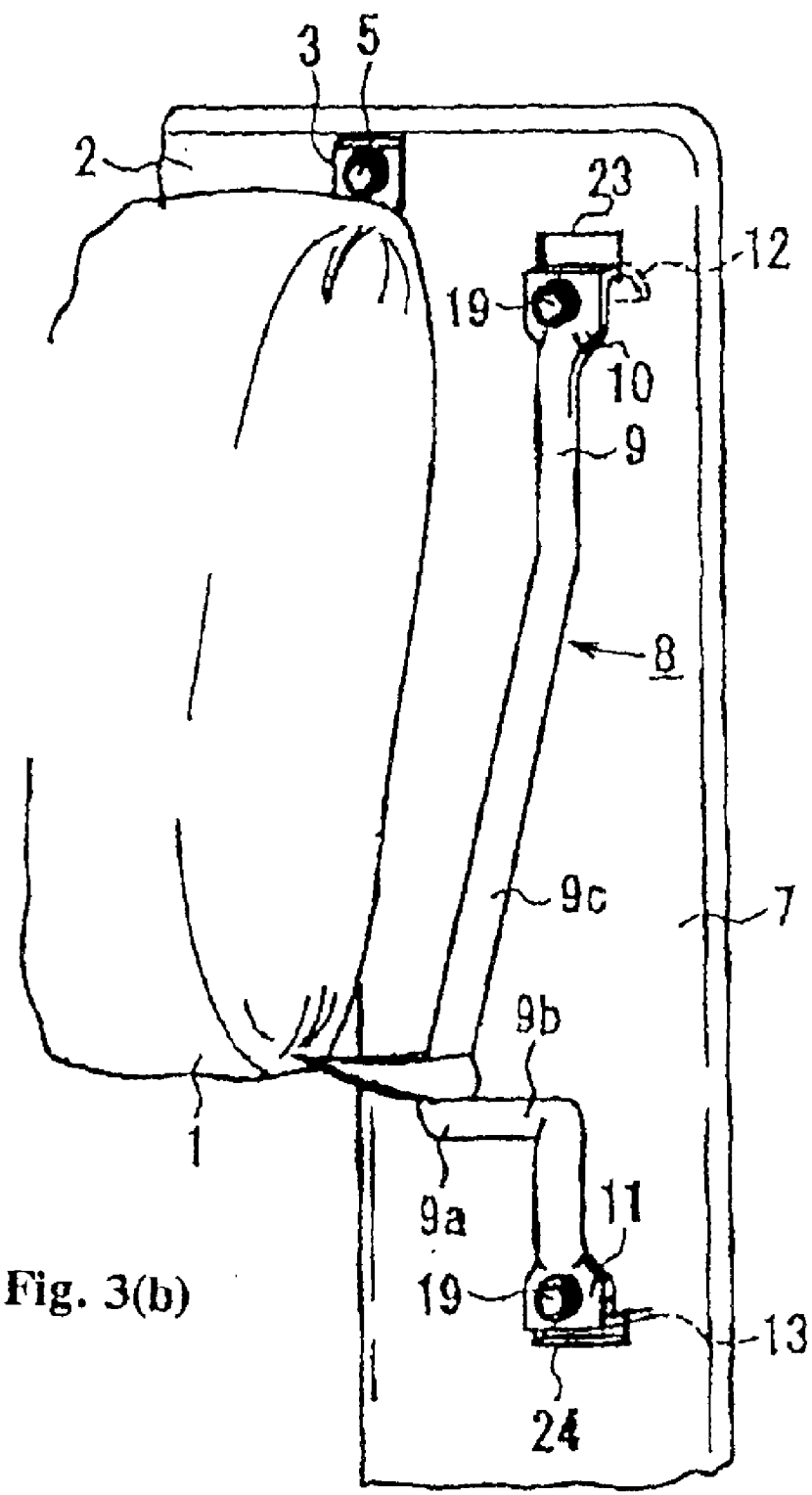

Other structures of the guide member 8A are the same as those of the guide member 8 of FIGS. 1 to 3 except that the guide member 8 does not have the temporarily tacking sections 12 and 13 at the upper and lower fixing sections 10 and 11, respectively. In FIG. 4, the same reference numerals as those of FIGS. 1 to 3 denote the same elements.

When the guide member 8A with such a structure is mounted to a C pillar (not shown), first, the clip 31 is elastically increased in diameter so as to separate both the extending pieces 32 and 32 of the temporarily tacking member 30 from each other, and the guide 9 is in turn fitted to the inner periphery of the clip 31 from between the extending pieces 32 and 32, thereby attaching the temporarily tacking members 30 to the vicinities of the upper end and the lower end of the guide 9.

Then, each temporarily tacking section 33 of the temporarily tacking member 30 is fitted to the corresponding opening (not shown) of the C pillar; thereby the guide member 8A is tacked to the C pillar; and in this state, the fixing sections 10 and 11 are fixed with bolts, so that the guide member 8A is secured to the C pillar.

Accordingly, even for the guide member 8A, there is no need to hold the guide member 8A by hand during bolting work, as for the guide member 8, and thus the guide member 8A can be mounted to the C pillar by a vary simple operation. Also, when the fixing sections 10 and 11 are fixed with bolts, the guide member 8A does not rotate with the bolts, having greatly high wording efficiency.

In the embodiment of FIG. 4, the temporarily tacking section 33 is a plate-like projection that linearly extends from the extending piece 32. However, it is also possible to provide a hook-shaped section at the end of the temporarily tacking section 33, in a manner similar to the temporarily tacking section 12 of the guide member 8, thereby ensuring to prevent the temporarily tacking section 33 from coming out of the opening during the temporal tacking, that is, the guide member 8A from dropping off the C pillar.

In the embodiment of FIGS. 1 to 3, the mooring section 9a is formed such that the guide 9 is bent so that the lower section leans forward (near the curtain airbag 1) from the middle to the lower end longitudinally; however, the structure of the mooring section is not limited to that.

Figure 5:
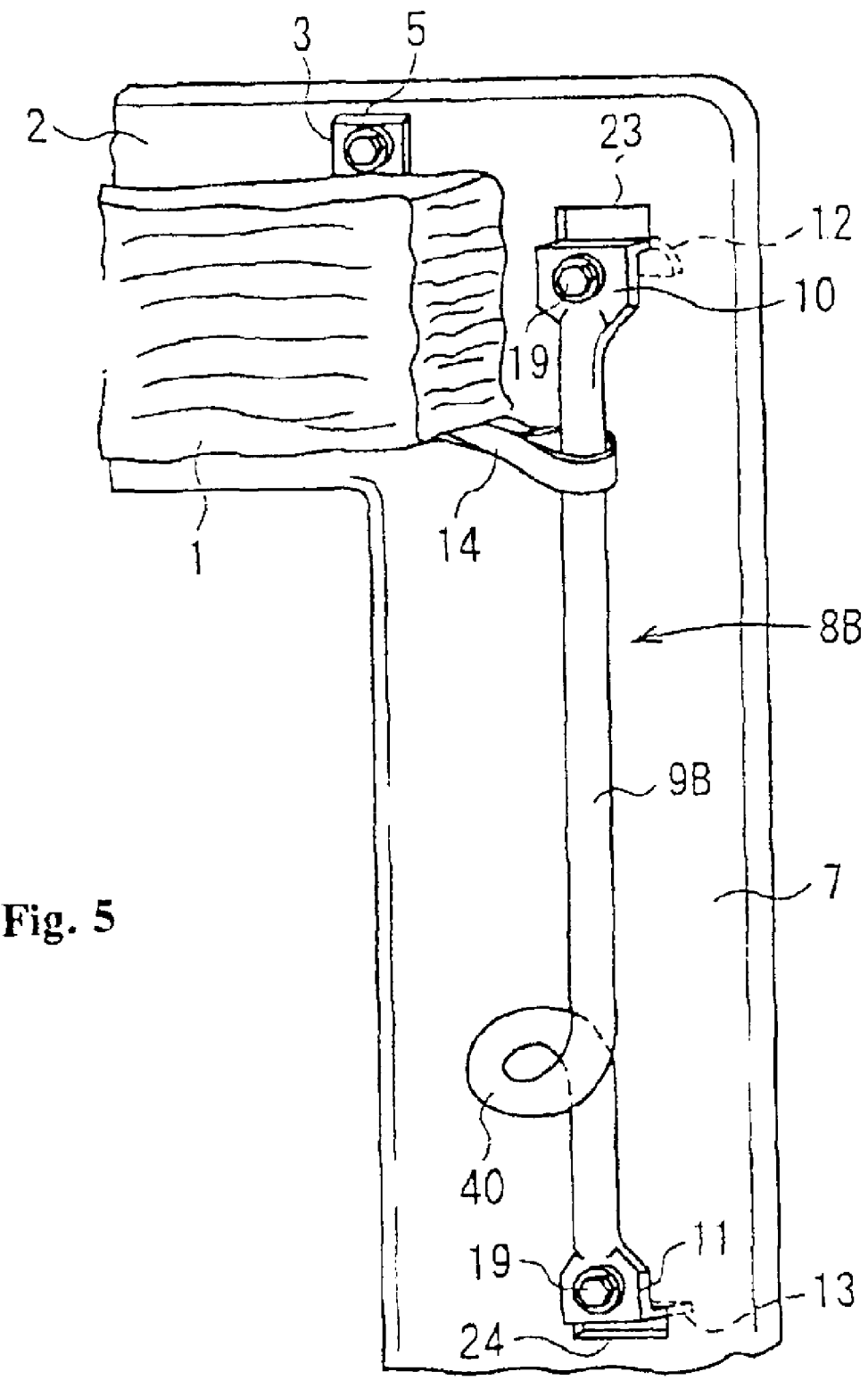
FIG. 5 is a perspective view of another embodiment.
Figure 6:
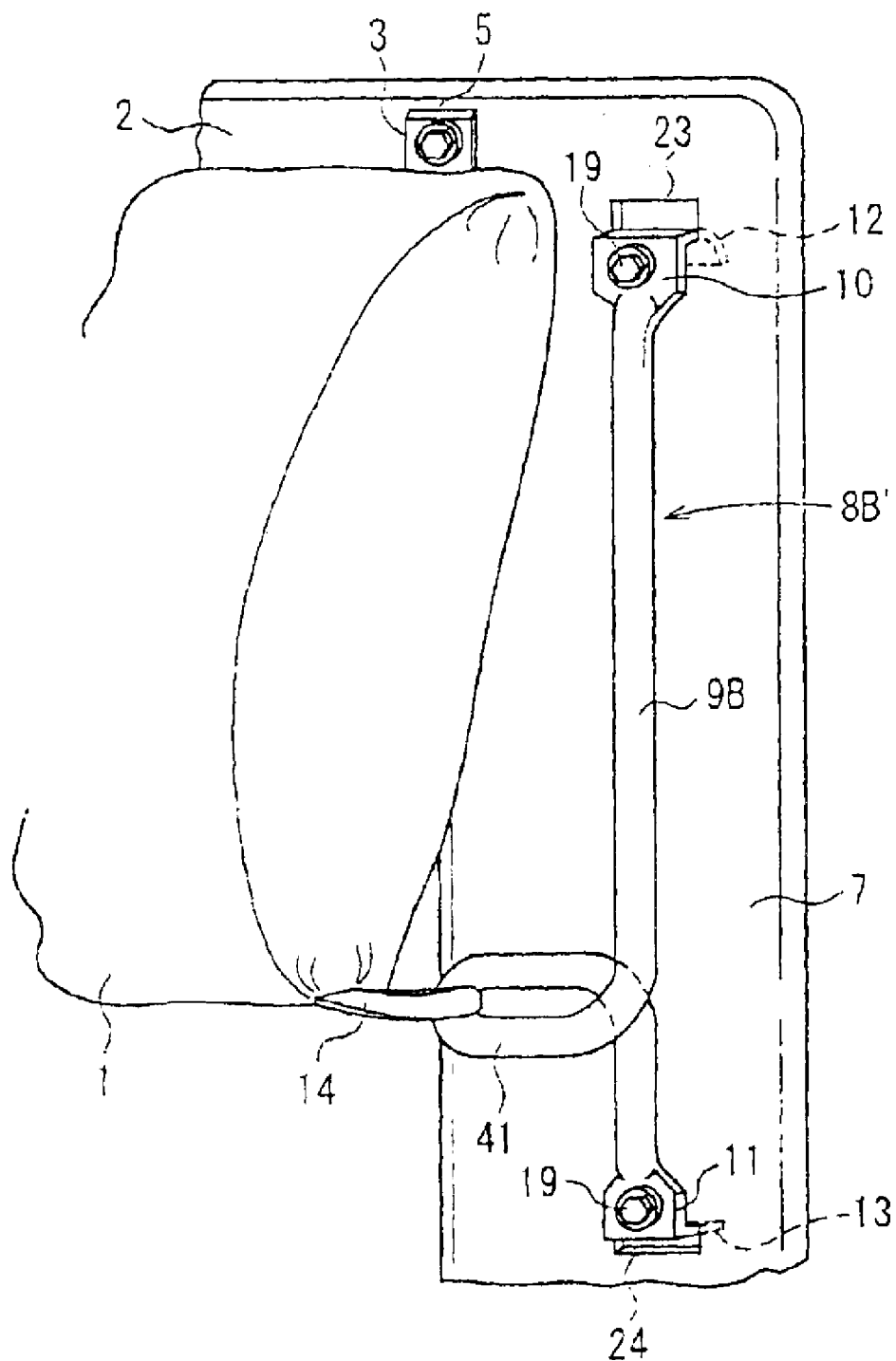
FIG. 6 is a perspective view of still another embodiment.

Other embodiments of the mooring section will be described hereinafter with reference to FIGS. 5 and 6. FIGS. 5 and 6 are perspective views of the vicinities of the C pillars to which guide members 8B and 8B' are mounted, respectively.

The guide member 8B of FIG. 5 also includes a rod-like guide 9B that extends vertically relative to the vehicle body along the C pillar 7, and the upper and lower fixing sections 10 and 11 for fixing the upper and lower ends of the guide 9B to the C pillar 7, respectively, and the temporarily tacking sections 12 and 13 for tacking both the upper and lower fixing sections 10 and 11 to the C pillar 7, respectively, when the guide member 8B is mounted to the C pillar 7. The rear end of the curtain airbag 1 is connected to the guide member 8B such that the loop-like connecting band 14 attached to the vicinity of the lower corner of the rear end is hooked around the guide 9B.

For the guide member 8B, a mooring section 40 is formed such that the lower part of the guide 9B which is substantially as high as the connecting band 14 of the curtain airbag 1 at the completion of inflation is bent forward (toward the curtain airbag 1) to form a loop.

Other structures of the guide member 8B are the same as those of the guide member 8 of FIGS. 1 to 3, wherein in FIG. 5, the same reference numerals as those of FIGS. 1 to 3 denote the same elements.

For the guide member 8B with such a structure, as the curtain airbag 1 is inflated to be deployed downward, the connecting band 14 is moved downward along the guide 9B, and when the curtain airbag 1 is inflated to substantially a maximum size, the connecting band 14 enters the mooring section 40. When the curtain airbag 1 has been fully inflated, the rear end of the curtain airbag 1 is pulled forward by tension applied to the outer surface, and also the connecting band 14 is pulled forward, thus being unable to come out from the mooring section 40. Accordingly, the rear end of the curtain airbag 1 is prevented from returning upward along the guide 9B.

A mooring section 41 of a guide member 8B' of FIG. 6 is formed such that the mooring section 40 of the guide member 8B of FIG. 5 is made of a radially plastically deformable material. Other structures are the same and the same reference numerals denote the same elements. For the guide member 8B', when the connecting band 14 enters the mooring section 41 as the curtain airbag 1 is deployed downward, and thereafter, the tension from the curtain airbag 1 is applied to the mooring section 41 through the connecting band 14, the mooring section 41 is pulled forward to be plastically deformed. Accordingly, the connecting band 14 is caught and secured by the mooring section 41 to prevent the rear end of the curtain airbag 1 from returning upward more reliably.

The embodiments described above are examples of the invention and the invention is not limited to the embodiments. For example, while the embodiments are constructed such that the C pillar 7 includes the guide member 8 to guide the rear end of the curtain airbag 1 downward relative to the vehicle body and along the C pillar 7 when the curtain airbag 1 is inflated. In the invention, however, the guide member may be provided to a B pillar or a D pillar. Alternatively, the guide member may be arranged at an A pillar to guide the front end of the curtain airbag.

As described in detail, according to the invention, there is provided a guide member for a curtain airbag which has remarkably high vehicle-installation efficiency. Also, according to the invention, it is also possible to prevent the end of the inflated curtain airbag from returning upward.

The priority application, Japanese Patent Application, Number 2002-212693, filed Jul. 22, 2002 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A guide member for guiding a curtain airbag which is deployed downward along a side structure of a compartment of a vehicle, wherein the guide member extends vertically and is mounted to a pillar of the vehicle, wherein the guide member includes:

a mooring section formed by a bend or curved section of the guide member so as to prevent the ends of a deployed curtain airbag from returning upward;

an upper section extending upward from the mooring section and slanting toward the rear of the vehicle as the upper section extends upwardly; and a vertical portion extending upward from the upper section.

2. The guide member of claim 1, further comprising a section that is configured to be temporarily connected to the vehicle prior to permanent installation of the guide member in the vehicle.

3. The guide member of claim 2, wherein the guide member is a pipe.

4. The guide member of claim 2, further comprising a section of the guide member that is configured to be permanently connected to the vehicle during installation of the guide member.

5. The guide member of claim 2, wherein the section of the guide member that is configured to be temporarily connected to the vehicle includes a projection that is configured to extend through openings in a vehicle pillar.

6. The guide member of claim 3, wherein the section of the guide member that is configured to be permanently connected to the vehicle during installation of the guide member includes openings for fasteners to pass through.

7. The guide member of claim 5, wherein the projection is hook shaped.

8. The guide member of claim 1, wherein the mooring section includes a looped section of the guide member.

9. The guide member of claim 1, wherein the mooring section includes a section of the guide member that is bent at least ninety degrees.

10. The guide member of claim 1, wherein each of an upper part and a lower part of the guide member includes a temporary tacking section for tacking the guide member to the pillar.

11. The guide member of claim 10, wherein the temporary tacking section extends in a direction generally perpendicular to the longitudinal direction of the guide member.

12. The guide member of claim 1, further comprising a leg shaped section extending toward the pillar for separating the vertical portion of the guide member from the pillar.

13. The guide member of claim 12, wherein the leg shaped section includes a curved portion for integrally connecting to the vertical portion.

14. The guide member of claim 13, wherein the leg shaped section is connected to an upper fixing portion for permanently connecting the guide member to the vehicle.

* * * * *

UNITED STATES PATENT AND TRADEMARK OFFICE
CERTIFICATE OF CORRECTION

PATENT NO. : 6,896,288 B2 Page 1 of 1
DATED : May 24, 2005
INVENTOR(S) : Tadashi Tanaka and Masayoshi Kumagai It is certified that error appears in the above-identified patent and that said Letters Patent is hereby corrected as shown below:

<u>Column, 7</u>
Lines 21-22, delete claim 8.

Signed and Sealed this

Thirty-first Day of January, 2006

JON W. DUDAS
*Director of the United States Patent and Trademark Office*